Aug. 24, 1954   M. B. MENTLEY   2,686,993
GENERATING APPARATUS
Filed Sept. 2, 1952
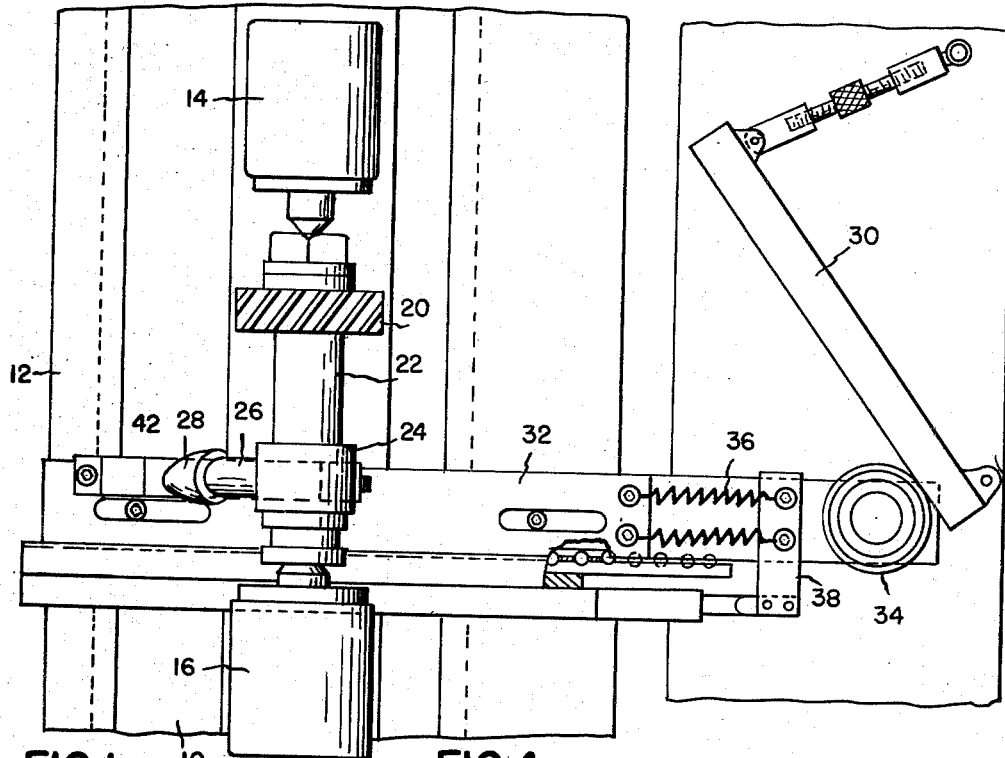
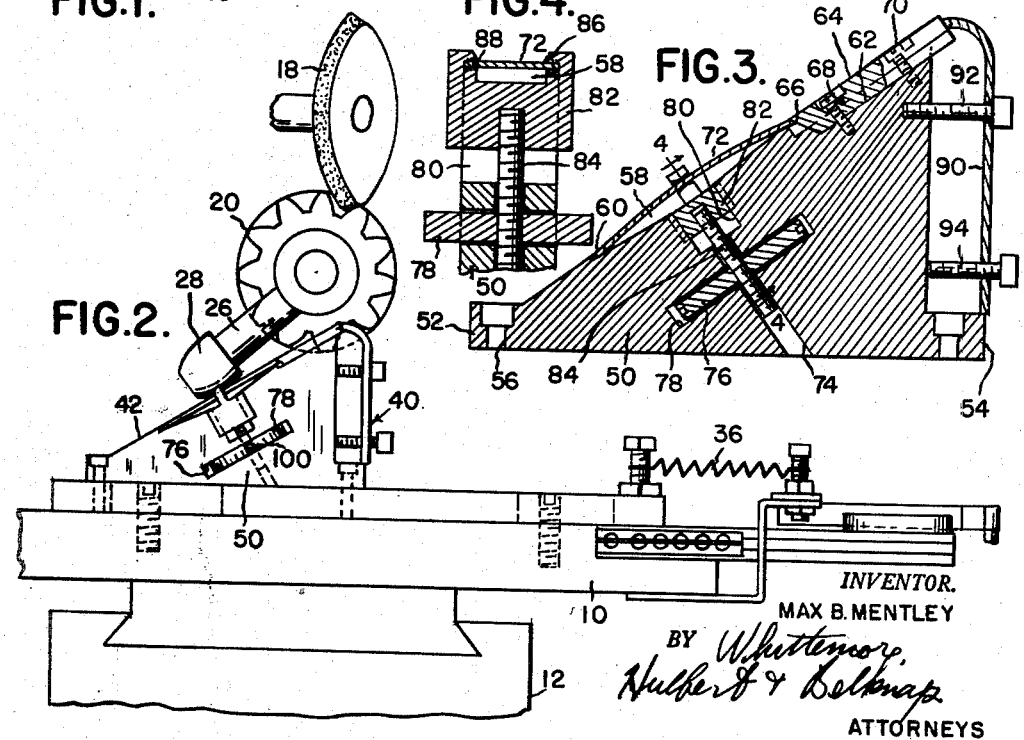
INVENTOR.
MAX B. MENTLEY
BY Whittemore,
Hulbert & Belknap
ATTORNEYS Patented Aug. 24, 1954

2,686,993

UNITED STATES PATENT OFFICE 2,686,993

GENERATING APPARATUS

Max B. Mentley, Detroit, Mich., assignor to National Broach & Machine Company, Detroit, Mich., a corporation of Michigan Application September 2, 1952, Serial No. 307,403

9 Claims. (Cl. 51—95)

The present invention relates to generating apparatus.

It is an object of the present invention to provide generating apparatus including a sine bar having means for adjusting the active surface of the sine bar.

It is a further object of the present invention to provide apparatus of the character described including a sine bar and adjustable means for rendering the active surface of the sine bar concave or convex.

More specifically, it is an object of the present invention to provide a sine bar including a flexible plate, means for supporting the ends of the plate, and means for adjusting the intermediate portion of the plate inwardly or outwardly to render the active surface of the plate respectively concave or convex.

It is a further object of the present invention to provide a machine tool comprising a spindle, a tool, means for effecting relative traverse between the spindle and tool, a sine bar, a follower carried by said spindle, means responsive to relative traverse between said spindle and tool for effecting relative traverse between said sine bar and spindle so as to effect controlled rotation of said spindle, said sine bar including means for adjusting the active surface thereof to a concave, plane, or convex surface.

It is a further object of the present invention to provide a machine tool as described in the preceding paragraph in which relative reciprocation between the spindle and tool is in a direction parallel to the axis of the spindle.

Other objects and features of the invention will become apparent as the description proceeds, especially when taken in conjunction with the accompanying drawings, wherein:

Figure 1 is a fragmentary plan view of a portion of a machine tool embodying the present invention.

Figure 2 is an end view of the machine tool illustrated in Figure 1.

Figure 3 is a transverse section through a sine bar embodying the present invention.

Figure 4 is a section on the line 4—4, Figure 3.

Referring now to Figures 1 and 2 the invention is illustrated as applied to a grinder comprising a reciprocable table 10 mounted on a base 12 carrying centers 14 and 16. Associated with the machine is a tool herein suggested as a grinding wheel 18 adapted to grind surfaces of the teeth of a work piece 20 herein illustrated as a helical gear. The gear 20 is carried by a supporting spindle 22 having secured thereto a collar 24 from which extends an arm 26 carrying a follower element 28. The follower element 28 may conveniently be in the form of an involute acorn of the type disclosed in prior copending application of Mentley et al., Serial No. 267,396, and assigned to assignee herein. For completeness in the present case however, it may be noted that the involute acorn 28 has a lateral surface which is a surface of revolution generated by rotating an involute about an axis radial with respect to the center of the base circle of the involute.

The particular type of machine chosen for illustration herein may be adapted to grind helical surfaces of the teeth of the gear 20 and for this purpose the grinding wheel 18 will have its axis inclined to an angle corresponding to the helix angle of the gear. In order to grind the surface of the teeth the table 10 is traversed and means are provided effective to produce controlled rotation of the spindle 22 so as to produce the required rotation of the work gear 20 to carry out the grinding operation. This means comprises in the first place an adjustable sine bar 30, a cross slide 32 having a roller 34 thereon engageable with the active surface of the sine bar 30, and springs 36 extending between a spring support 38 and the end of the cross slide 32 effective to retain the roller 34 in engagement with the active surface of the sine bar 30. Dependent on the angle of adjustment of the sine bar 30, the cross slide 32 will be given a traversing movement dependent upon the movement of the table 10 in the direction of the axis of the work piece 20. In order to produce the required rotation of the spindle 22, a second sine bar assembly 40 is provided which includes an active surface 42 engageable with a lateral surface of the involute acorn, thus axial movement of the table 10 results in a controlled rotation of the spindle 22.

In accordance with the present invention means are provided for effecting an adjustment of the active surface of the sine bar 40 and this means is best illustrated by referring to Figures 3 and 4. As seen in these figures the sine bar mechanism comprises a body 50 having laterally extending ears 52 and 54 apertured as indicated at 56 for the reception of bolts to mount the body 50 onto the cross slide 32. The body 50 has its intermediate portion recessed as indicated at 58, this recess terminating at one end in an overhanging seat 60. At the opposite end the body 50 is provided with ways 62 in which is adjustably mounted a pressure element 64. The pressure element 64 has its inner end beveled as indicated at 66 to produce a second overhanging seat for a purpose which will presently appear. The pressure element 64 is in addition provided with elongated slots 68 for the reception of screws 70 by means of which the pressure element may be firmly locked in adjusted position.

A flexible plate 72 is provided having its ends beveled so as to engage beneath the overhanging seat 60 at one end and cooperating with the overhanging bevel 66 at the inner end of the pressure element 64.

The body 50 is provided with an opening 74 extending therethrough which intersects with a transversely extending slot 76 in which is received a knurled nut 78. The transverse opening 74 intersects an opening 80 adjacent the upper end of the body in which is slidably received a block 82 having a threaded stud 84 extending downwardly therefrom and threadedly engaged in the nut 78. The block 82 includes a pair of upwardly extending ears 86 having slots 88 formed therein to engage edge portions of the plate 72. As will be apparent, rotation of the nut 78 results in moving the block 82 in a direction perpendicular to the plate 72 and accordingly will flex the plate inwardly or outwardly to render the active surface of the sine bar respectively concave or convex.

The end of the sine bar assembly includes a strip 90 secured intermediate its ends to the end of the body 50 by a screw 92. The upper end of the strip 90 is curved inwardly to engage the end of the pressure element 64. Adjacent its lower end the strip 90 carries an adjusting screw 94. The purpose of the strip 90 will now be described. Assuming that the plate 72 is in unstressed condition or occupies the plane of the active surface of the sine bar, it is desired to move the intermediate portion of the plate outwardly to produce the convex configuration illustrated in Figure 3. Inasmuch as the overhanging seat 60 is fixed and since the flexing of the plate results in downward movement of its upper end, it is necessary to move the pressure element 64 downwardly to maintain contact with the strip 72. For this purpose the screws 70 are loosened and pressure is applied to the pressure element through the strip 90 by moving the lower end of the strip 90 outwardly by rotating the adjusting screw 94. This will move the pressure element 64 downwardly into firm cooperating engagement with the upper beveled end of the plate 72 and while the parts are thus held, screws 70 may be tightened thus completing the adjustment and locking the parts in adjusted position.

It will be appreciated that when the plate 72 is plane and coplanar with the active surface of the sine bar, that traverse of the table 10 will result in uniform rotation of the spindle 22 and hence the grinding wheel 10 will follow a true helical path on the teeth of the cutter. If, however, it is desired to impart a modification to the gear teeth, the plate 72 is bowed concavely or convexly as desired, with the result that there will be a controlled acceleration and deceleration of the spindle 22 with respect to its average rotation. Thus, the grinding operation carried out under these conditions in which the grinding wheel contacts one side only of a single tooth, will result in a tooth which is generally helical in accordance with the setting of the machine, but which has a surface slightly modified from the helical so as to appear slightly bowed or convex as compared to a true helical tooth, or slightly hollow or concave as compared to a true helical tooth, as desired.

The plate 72 is formed of strong resilient material and when it is bowed as illustrated in Figure 3, it will be uniformly bowed either concavely or convexly as desired so as to impart uniform modification to the ground teeth. However, the location of the sine bar assembly 40 may be varied with respect to the other structure so that if desired the high point or low point of the modification of the ground teeth may be displaced from the center of the teeth toward either end thereof as desired.

Obviously, the periphery of the nut 78 may if desired be provided with indicia indicated generally at 100 so as to permit repeat setting of the sine bar if desired.

The drawings and the foregoing specification constitute a description of the improved generating apparatus in such full, clear, concise and exact terms as to enable any person skilled in the art to practice the invention, the scope of which is indicated by the appended claims.

What I claim as my invention is:

1. In a machine, a rotary spindle, an arm extending from said spindle, first sine bar mechanism comprising a sine bar movable in a direction perpendicular to said spindle and a follower on said arm engaging the active surface of said sine bar, and adjustable means for imparting slight convex or concave curvature to the active surface of said sine bar, said adjustable means comprising a flexible plate, means for supporting the ends of said plate, and means for flexing the intermediate portion of said plate toward and away from said sine bar, a tool, means for effecting relative traverse between said spindle and said tool parallel to the axis of said spindle, and second sine bar mechanism responsive to such relative traverse to effect relative traverse between the sine bar and follower of said first sine bar mechanism in the plane of rotation of said follower.

2. A grinder for imparting a modification to gear teeth from end to end thereof which comprises a grinding wheel having its peripheral portion trimmed to conform to a desired gear tooth profile, gear support means for supporting a gear with a tooth surface thereof in engagement with the said periphery of said wheel, means for rotating said wheel, means for relatively traversing said gear support means and said wheel in the direction of the axis of said gear, a first sine bar mechanism including parts movable relative to each other in accordance with relative traverse of said gear support means and wheel, a second sine bar mechanism including a part movable by said first sine bar mechanism in a direction perpendicular to the axis of said gear and a cooperating part connected to said gear support means for effecting rotation of said gear in accordance with relative traverse between said gear support means and said wheel, one of said sine bar mechanisms including a follower and a sine bar having a surface engageable by the sine bar follower which is curved in the direction of relative movement between said sine bar and its follower.

3. Gear grinding apparatus comprising a base, a grinding wheel on said base, means for driving said wheel in rotation, a table mounted for reciprocation on said base, gear support means on said base for mounting a work gear for rotation about its axis and for reciprocation in a direction parallel to the gear axis, a first sine bar mechanism comprising parts including a sine bar part inclined to the direction of reciprocation and a follower part, one of said parts being fixed on said base and the other of said parts being movable by said one part in a direction perpendicular to the gear axis, a second sine bar mechanism including a sine bar part connected to the movable part of said first sine bar mechanism for movement perpendicular to the axis of the gear, and a follower part connected to said gear support means to impart rotation to said gear in accordance with its axial movement, one of said sine bar parts having a surface engaged by its associated follower part curved in the direction of movement of said last named follower over said surface.

4. A grinder as defined in claim 3 in which said one sine bar part is provided with an adjustable flexible segment, and means for imparting curvature to said segment.

5. A grinder as defined in claim 3, said grinding wheel being offset from a line radial of said gear parallel to the plane of said wheel.

6. A grinder as defined in claim 3 in which the curved sine bar surface is in said second sine bar mechanism.

7. Gear grinding apparatus comprising a base, a grinding wheel on said base, means for driving said wheel in rotation, a table mounted for reciprocation on said table, gear support means on said base for mounting a work gear with its axis parallel to the direction of reciprocation of said table and for rotation about its axis, a first sine bar mechanism comprising a first sine bar fixed to said base and having a surface inclined to the direction of reciprocation of said table, a first follower movable with said table in reciprocation and movable on said table by said surface in a direction perpendicular to the axis of the gear, a second sine bar on said base connected to said first follower for movement perpendicular to the axis of the gear, and a follower fixed to said gear support means and engageable with said second sine bar, the surface of said second sine bar engaged by the associated follower being curved in the direction of relative movement of said second follower thereover.

8. A grinder as defined in claim 7, said grinding wheel being offset from a line radial of said gear parallel to the plane of said wheel.

9. A grinder as defined in claim 7 in which said second sine bar has an adjustable flexible segment providing the curved surface thereof engaged by the associated follower.

References Cited in the file of this patent

UNITED STATES PATENTS

| Number | Name | Date |
|---|---|---|
| 612,698 | Bolton | Oct. 18, 1898 |
| 1,956,505 | Horner | Apr. 24, 1934 |
| 2,282,038 | Davenport | May 5, 1942 |
| 2,347,998 | Drummond | May 2, 1944 |
| 2,574,110 | Kopec | Nov. 6, 1951 |